No. 674,912. Patented May 28, 1901.
J. ELLENBECKER.
REVOLVING CHAIR.
(Application filed Feb. 4, 1901.)
(No Model.)

Witnesses.

Inventor.
John Ellenbecker
By Benedict & Morsell
Attorneys.

UNITED STATES PATENT OFFICE.

JOHN ELLENBECKER, OF PORT WASHINGTON, WISCONSIN.

REVOLVING CHAIR.

SPECIFICATION forming part of Letters Patent No. 674,912, dated May 28, 1901.

Application filed February 4, 1901. Serial No. 45,809. (No model.)

*To all whom it may concern:*

Be it known that I, JOHN ELLENBECKER, of Port Washington, in the county of Ozaukee and State of Wisconsin, have invented a new and useful Improvement in Revolving Chairs, of which the following is a description, reference being had to the accompanying drawings, which are a part of this specification.

My invention relates to improvements in revolving chairs of that class in which the chair-seat is adapted to revolve freely, while provision is made for the raising or lowering of the seat independently of its revolution.

The invention consists of the devices and their combinations, as herein described and claimed or the equivalents thereof.

Figure 1:
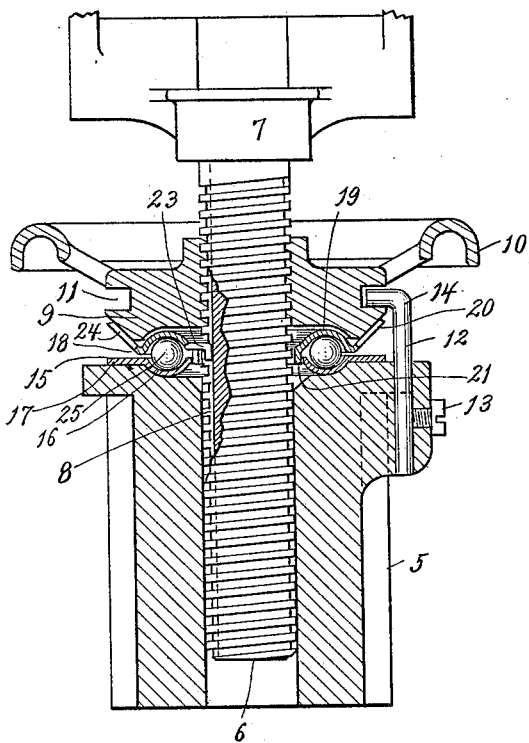
Figure 2:
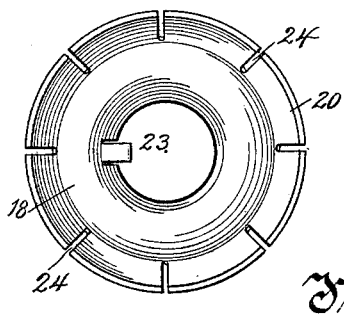
Figure 3:
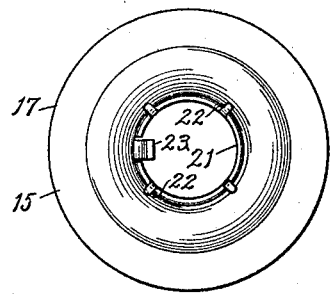
Figure 4:
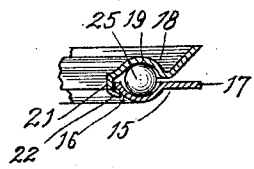

In the drawings, Figure 1 is a vertical section of the hub, the nut, and the interposed locking and antifriction device, the spindle employed therewith being shown in elevation but broken away to exhibit otherwise hidden construction. Fig. 2 is a top plan view of the locking and antifriction device. Fig. 3 is an under side view of the locking and antifriction device. Fig. 4 is a fragment of the locking and antifriction device, the end in the foreground being in transverse section.

In the drawings, 5 is a hub, usually constructed integrally of metal, in which the legs of the chair are fitted and which supports the chair-seat by means of the revolving and adjusting devices thereon. This hub is provided with a central vertical smooth bore, in which the spindle 6 fits rotatably. The spindle is provided with a head 7 fixed thereon, on which head the chair-seat is placed. The spindle is screw-threaded and is provided with a longitudinal groove 8 therein at one side thereof. A nut 9 turns on the thread on the spindle and is supported revolubly on the hub 5, the hub in turn supporting the spindle 6 and the chair-seat thereon. By the rotation of the nut 9 on the spindle 6 the chair-seat is adjustable vertically, and when so adjusted the nut and the spindle are rotatable freely on the hub. The nut 9 is provided with a hand-wheel 10, by means of which it can be readily rotated. The nut is also provided with an annular groove 11, and a retaining device consisting of a rod 12 is provided, which rod fits movable vertically in an aperture therefor in the hub 5 and is secured releasably in the hub by means of a set-screw 13. By this construction the rod 12 is readily adjustable vertically in the hub 5. The rod is overturned at its upper end, forming a laterally-extending head 14, which enters loosely the annular groove 11 in the nut 9. By means of this retaining device the nut 9 and its load are secured revolubly to the nut 5, and also adjustably and releasably, whereby any wear can be taken up and the removal of the nut is permitted.

Interposed between the hub and the nut there is a locking and antifriction device which consists of a lower plate 15, advisably formed of sheet-steel, which plate is in annular form about the spindle 6 and is provided with a concave annular groove 16 and a flat radially-projecting flange 17, the plate being fitted into and resting on the top of the hub 5 about the spindle 6. An upper plate 18, also advisably constructed of sheet-steel, is in annular form about the spindle 6 and has an inverted annular concave groove 19 and a radial obliquely upwardly turned rim 20 exteriorly of the concave groove. This upper plate 18 at its inner circular edge is turned downwardly, forming a flange 21, that fits loosely within the circular central aperture in the plate 15 and about the spindle 6, and this flange 21 is provided with short fingers 22 22 integral with the flange, which fingers are turned under the inner edge of the plate 15 and prevent the separation of the plates from each other, while permitting the upper plate to revolve freely on the lower plate. The plate 18 is provided with an inwardly-extending and vertically-turned tongue 23, which enters loosely the groove 8 in the spindle 6. By means of this tongue the plate 18 is held to rotation with the spindle 6. The obliquely upwardly turned rim 20 of the plate 18 forms an annular cup-shaped or oblique wall, against which a correspondingly-inclined exterior wall or surface of the nut 9 fits snugly and wedgingly, so that when the weight of the nut, with the spindle and its load, rests on the rim 20 wedgingly the plate and the nut are held frictionally to concurrent rotation on and above the plate 15. The rim 20 is advisably notched or serrated by radially-disposed recesses 24, cutting the rim into sections, so that the rim of the plate, which is of steel or other elastic material, will fit more perfectly to the surface of the nut than it might otherwise do, and the nut will be thereby made more readily releasable from the plate. Antifriction-balls 25 are placed in the annular runway formed by the reversely-disposed annular grooves 16 and 19, these balls serving as bearings between the plates 15 and 18, which plates and the balls form the locking and antifriction device interposed between the hub and the nut.

What I claim as my invention is—

1. In combination in a revolving chair, a hub having a smooth bore, a screw-threaded spindle revoluble freely in the bore of the hub, a nut provided exteriorly with an annular groove the nut resting on the hub and turning by its thread on the spindle, and an adjustable nut-retaining device consisting of a straight rod fitted movably in an aperture therefor in the hub and provided with a head entering the annular groove in the nut, and means in the hub adapted to secure the rod releasably to the hub.

2. In combination in a revolving chair, a hub having a smooth bore, a screw-threaded spindle provided with a longitudinal groove and revoluble freely in the bore of the hub, a nut turning on the spindle and provided with a beveled exterior surface, a locking and antifriction device interposed about the spindle between the hub and the nut comprising a lower plate having an annular ball-groove and resting on the hub, an upper plate having a complementary annular ball-groove with means securing the upper plate revolubly but against separation to the lower plate and a tongue entering the groove in the spindle, and an oblique projecting rim on which the nut rests wedgingly and releasably.

3. In combination in a revolving chair, a hub having a smooth bore, a screw-threaded spindle provided with a longitudinal groove and revoluble freely in the bore of the hub, a nut turning on the spindle and provided with a beveled exterior surface, and a locking device interposed between the hub and the nut, said locking device including a plate having an inverted annular ball-runway, a tongue entering the groove in the spindle, and an obliquely-disposed rim adapted to receive said nut thereon wedgingly and releasably.

4. In a revolving-chair iron, a thin annular metal plate comprising an inwardly-projecting tongue, an annular ball-runway and an exterior obliquely-disposed rim adapted to lock parts to each other releasably as set forth.

In testimony whereof I affix my signature in presence of two witnesses.

JOHN ELLENBECKER.

Witnesses:
WM. AHLHAUSER,
ELSA EGHART.